US012798888B2

(12) United States Patent
Van Zee et al.

(10) Patent No.: US 12,798,888 B2
(45) Date of Patent: Nov. 17, 2026

(54) BRACKET ASSEMBLIES FOR SECURING A ROLLER

(71) Applicant: Precision, Inc., Pella, IA (US)

(72) Inventors: Anthony David Van Zee, Pella, IA (US); Wade Anthony Morrow, Centerville, IA (US); Chad Arthur Beyer, Monroe, IA (US); Tim Erwin Wolf, Ankeny, IA (US)

(73) Assignee: PRECISION, INC., Pella, IA (US)

( * ) Notice: Subject to any disclaimer, the term of this patent is extended or adjusted under 35 U.S.C. 154(b) by 196 days.

(21) Appl. No.: 18/885,047

(22) Filed: Sep. 13, 2024

(65) Prior Publication Data

US 2025/0115438 A1 Apr. 10, 2025

Related U.S. Application Data

(60) Provisional application No. 63/587,901, filed on Oct. 4, 2023.

(51) Int. Cl.
*B65G 39/16* (2006.01)
*B65G 15/60* (2006.01)

(52) U.S. Cl.
CPC ............. *B65G 39/16* (2013.01); *B65G 15/60* (2013.01)

(58) Field of Classification Search
None
See application file for complete search history.

(56) References Cited

U.S. PATENT DOCUMENTS

| | | | | |
|---|---|---|---|---|
| 2,593,089 A * | 4/1952 | Leonard | B65G 13/11 | 193/35 R |
| 3,545,599 A * | 12/1970 | Barber | B65G 39/16 | 474/104 |
| 4,486,056 A * | 12/1984 | Brandenstein | F16C 13/022 | 384/546 |
| 4,775,355 A * | 10/1988 | Mizukoshi | F16D 3/205 | 464/111 |
| 5,332,083 A * | 7/1994 | Axmann | B65G 15/02 | 198/831 |
| 5,358,098 A * | 10/1994 | Sundstrom | B65G 39/16 | 198/806 |
| 5,394,222 A * | 2/1995 | Genovese | B65G 39/16 | 399/167 |
| 5,609,241 A * | 3/1997 | Shaw | B65G 39/16 | 226/23 |
| 5,743,378 A * | 4/1998 | Hovst.o slashed | B65G 39/16 | 198/840 |
| 6,116,410 A * | 9/2000 | Malmberg | B65G 23/44 | 198/806 |
| 6,186,317 B1 * | 2/2001 | Hovsto | B65G 39/16 | 198/806 |
| 6,431,348 B2 * | 8/2002 | Malmberg | B65G 39/16 | 198/806 |
| 7,374,072 B2 * | 5/2008 | Irwin | B65H 26/02 | 226/20 |
| 7,614,493 B2 * | 11/2009 | Dowling | B65G 39/16 | 198/837 |

(Continued)

*Primary Examiner* — Gene O Crawford
*Assistant Examiner* — Muhammad Awais
(74) *Attorney, Agent, or Firm* — Armstrong Teasdale LLP

(57) ABSTRACT

Bracket assemblies for securing a conveyor roller to a conveyor support frame are disclosed. The bracket assembly is adjustable by an operator to change the position of the roller to better align a conveyor belt supported by the roller.

20 Claims, 20 Drawing Sheets

(56) References Cited

U.S. PATENT DOCUMENTS

| | | | | |
|---|---|---|---|---|
| 7,686,157 | B2 * | 3/2010 | Murayama | B65G 39/16 198/806 |
| 7,761,045 | B2 * | 7/2010 | Fujimori | G03G 15/2053 399/329 |
| 8,360,233 | B2 * | 1/2013 | Eriksson | B65G 39/16 198/810.04 |
| 8,474,604 | B2 * | 7/2013 | Khanania | B65G 15/64 198/806 |
| 9,884,730 | B2 * | 2/2018 | DeVries | B65G 39/16 |
| 10,836,581 | B2 * | 11/2020 | DeGroot | B65G 23/44 |
| 11,332,320 | B2 | 5/2022 | Boire | |
| 2002/0060139 | A1 * | 5/2002 | Schiesser | B65G 39/12 198/782 |
| 2006/0076217 | A1 * | 4/2006 | Cumberlege | B65G 39/16 198/806 |
| 2006/0108201 | A1 * | 5/2006 | Swinderman | B65G 45/16 198/499 |
| 2009/0260956 | A1 * | 10/2009 | Dunn | B65G 39/16 198/825 |
| 2010/0072037 | A1 * | 3/2010 | Jabber | B65G 15/00 198/842 |
| 2011/0272250 | A1 * | 11/2011 | DeVries | B65G 39/16 198/806 |
| 2013/0233680 | A1 * | 9/2013 | Sharp | B65G 39/16 198/806 |
| 2013/0284565 | A1 * | 10/2013 | Kuiper | B65G 39/16 198/806 |
| 2015/0166264 | A1 * | 6/2015 | Ballou | B65G 39/16 198/806 |
| 2016/0107842 | A1 * | 4/2016 | Hartney | B65G 39/12 198/806 |
| 2016/0304290 | A1 * | 10/2016 | Reischl | B65G 39/12 |
| 2021/0347579 | A1 * | 11/2021 | Boire | B65G 39/12 |
| 2022/0063920 | A1 * | 3/2022 | Waters | B65G 39/16 |
| 2022/0250854 | A1 * | 8/2022 | DeGroot | B65G 45/16 |
| 2022/0411192 | A1 * | 12/2022 | Sadasivan | B65G 13/11 |

* cited by examiner

BRACKET ASSEMBLIES FOR SECURING A ROLLER

CROSS-REFERENCE TO RELATED APPLICATIONS

This application claims the benefit of U.S. Provisional Patent Application No. 63/587,901, filed Oct. 4, 2023, which is incorporated herein by reference in its entirety.

TECHNICAL FIELD

The field of the disclosure relates to bracket assemblies for securing a conveyor roller to a conveyor support frame and, in particular, bracket assemblies that enable the position of the roller to be adjusted to change the alignment of the conveyor belt.

BACKGROUND

Conveyor systems for moving articles may include a conveyor belt that travels over a plurality of idler rollers that support the conveyor belt. The idler rollers are supported by a pair of bracket assemblies which support the roller at each end. Each bracket assembly is connected to a support frame of the conveyor system. The conveyor belt may be driven by a drive pulley which acts to rotate the conveyor belt about the conveyor system. As the conveyor belt rotates, the belt may become misaligned on one or more of the rollers which causes the belt to wear relatively quickly and increases the possibility of belt failure.

A need exists for bracket assemblies that allow an operator to change the position of the conveyor belt roller to realign the conveyor belt.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a bracket assembly for changing the position of a roller to align a conveyor belt. The bracket assembly includes a first bracket having an opening for receiving a roller shaft. A second bracket is pivotally connected to the first bracket. The second bracket includes a first portion for connecting the second bracket to a support frame and a second portion perpendicular to the first portion. The second portion is pivotally connected to the first bracket. The second portion includes an outer face which defines an outer face plane that is coincident with at least a portion of the outer face. A fastener is moveable between a locked position in which the first bracket is prevented from pivoting relative to the second bracket and an unlocked position in which the first bracket may pivot relative to the second bracket. The bracket assembly includes a handle that enables an operator to pivot the first bracket relative to the second bracket. The handle extends through the outer face plane defined by the second portion of the second bracket.

Another aspect of the present disclosure is directed to a bracket assembly for changing the position of a roller to align a conveyor belt. The bracket assembly includes a first bracket having an opening for receiving a roller shaft. The bracket assembly includes a second bracket for connecting the bracket assembly to a frame. The second bracket is pivotally connected to the first bracket. A turnbuckle is connected to the first bracket and the second bracket. The turnbuckle includes a threaded barrel and at least one pin which threadingly engages the barrel. Rotation of the barrel causes the first bracket to pivot relative to the second bracket.

Yet another aspect of the present disclosure is directed to a bracket assembly for changing the position of a roller to align a conveyor belt. The bracket assembly includes a first bracket having an opening for receiving a roller shaft and a second bracket for connecting the bracket assembly to a frame. The bracket assembly also includes a third bracket. The second bracket is disposed between the first bracket and the third bracket. The third bracket is connected to the first bracket. A handle enables an operator to slide the first bracket and third bracket relative to the second bracket. The bracket assembly includes a locking fastener that is moveable between a locked position in which the first and third brackets are prevented from sliding relative to the second bracket and an unlocked position in which the first bracket and third bracket may slide relative to the second bracket.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
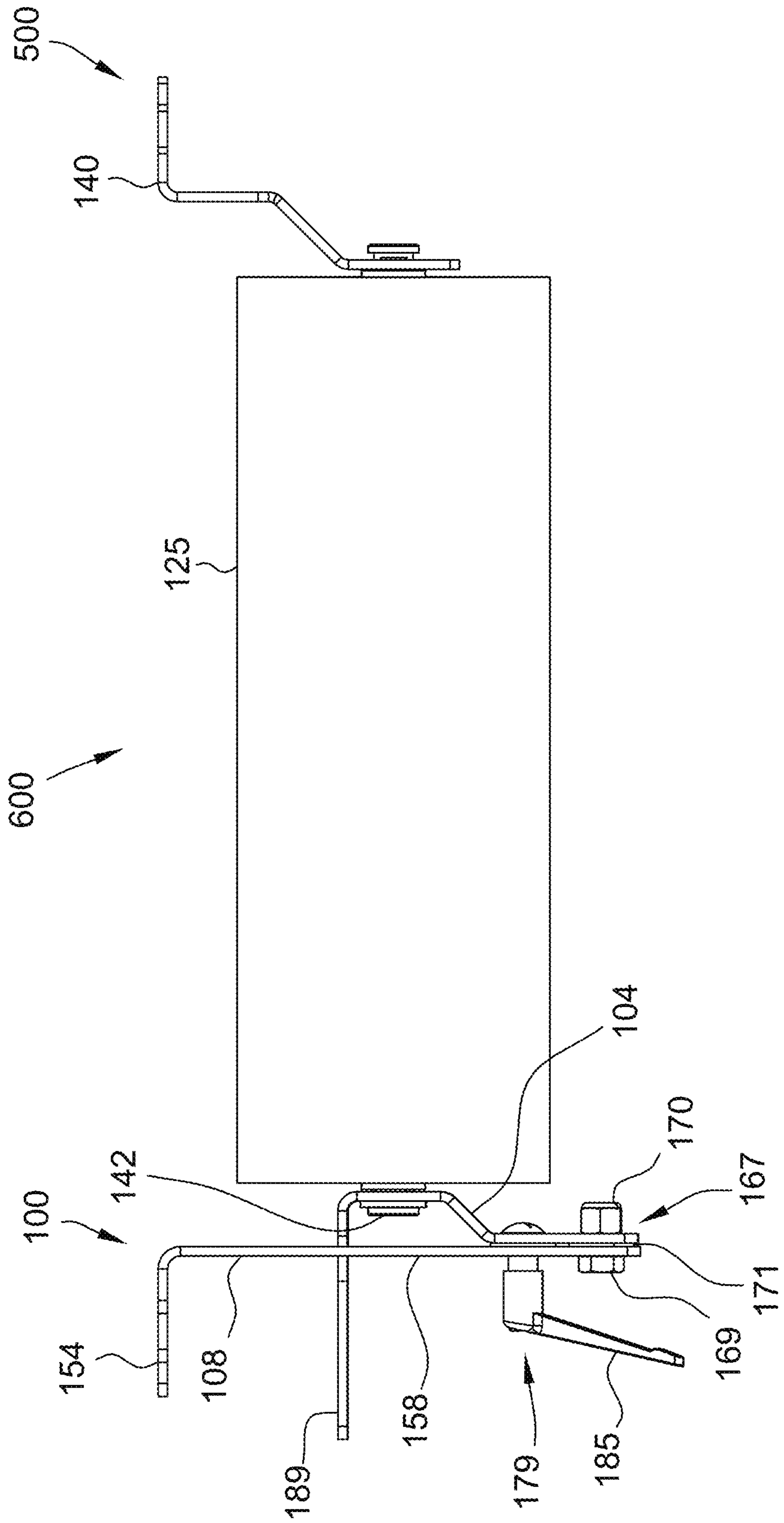
FIG. 1 is a front view of first and second bracket assemblies securing a conveyor belt roller.

Provisions of the present disclosure relate to bracket assemblies for changing the position of a roller of a conveyor system. By changing the position of the roller, the conveyor belt may be better aligned on the conveyor. An example bracket assembly 100 is shown in FIG. 1. The bracket assembly 100 (which may also be referred to herein as the "first bracket assembly") is used to secure a conveyor roller 125 to a support frame (not shown) of a conveyor system. The bracket assembly 100 may be used in combination with a second bracket assembly 140. The second bracket assembly 140 may be configured differently than the first bracket assembly 100 and may be nonadjustable. In other embodiments, both bracket assemblies are adjustable.

The conveyor roller 125 includes a roll body 127 (FIG. 5) that rotates about a shaft or pin 129. The shaft 129 may extend along the length of the roller 125 or partially along the length such as when two "stub shafts" are used. The shaft 129 may include a collar 135 disposed at the end of the shaft 129 that has a larger diameter than the rest of the shaft 129. The shaft 129 may include first and second recesses 137, 139 that prevent the shaft 129 from rotating when positioned in the first and second bracket assemblies 100, 140 (FIG. 1).

Figure 4:
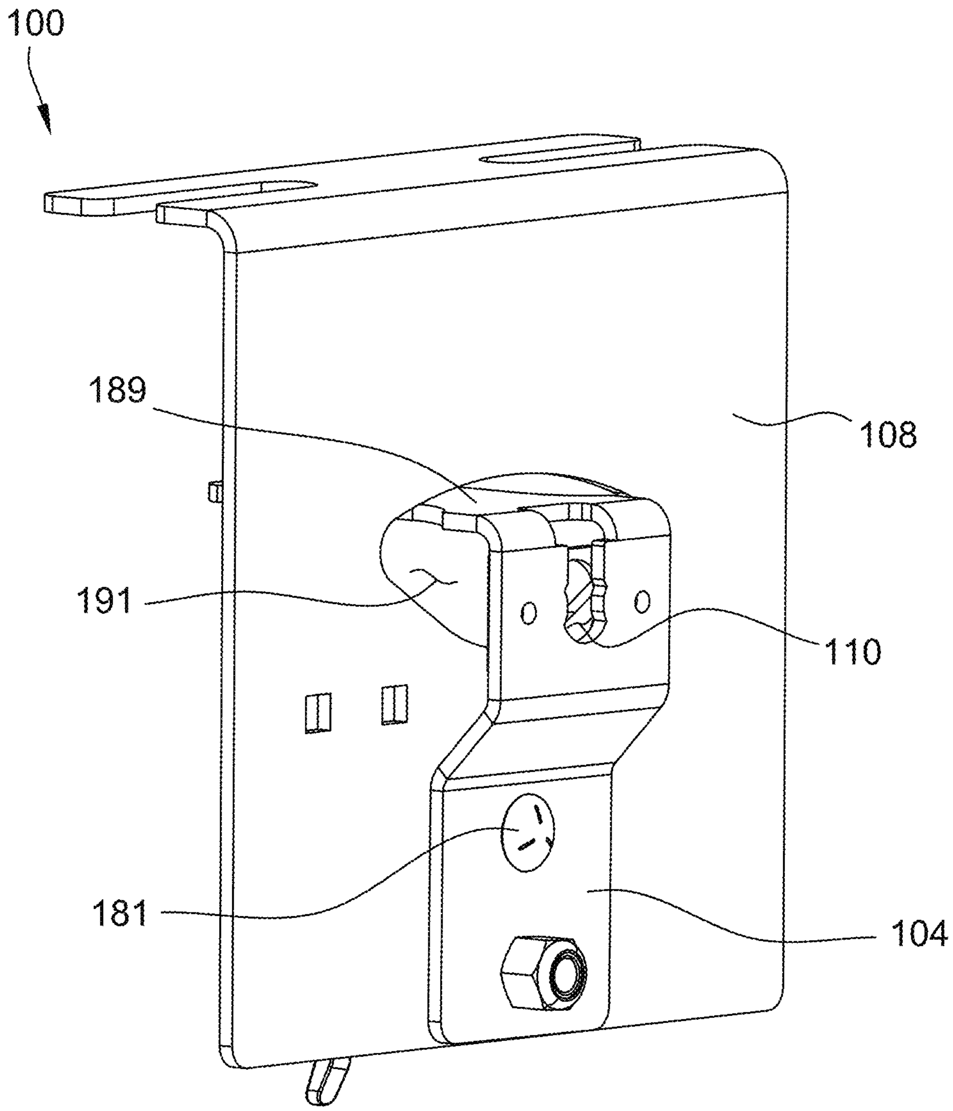
FIG. 4 is another perspective view of the first bracket assembly.
Figure 5:
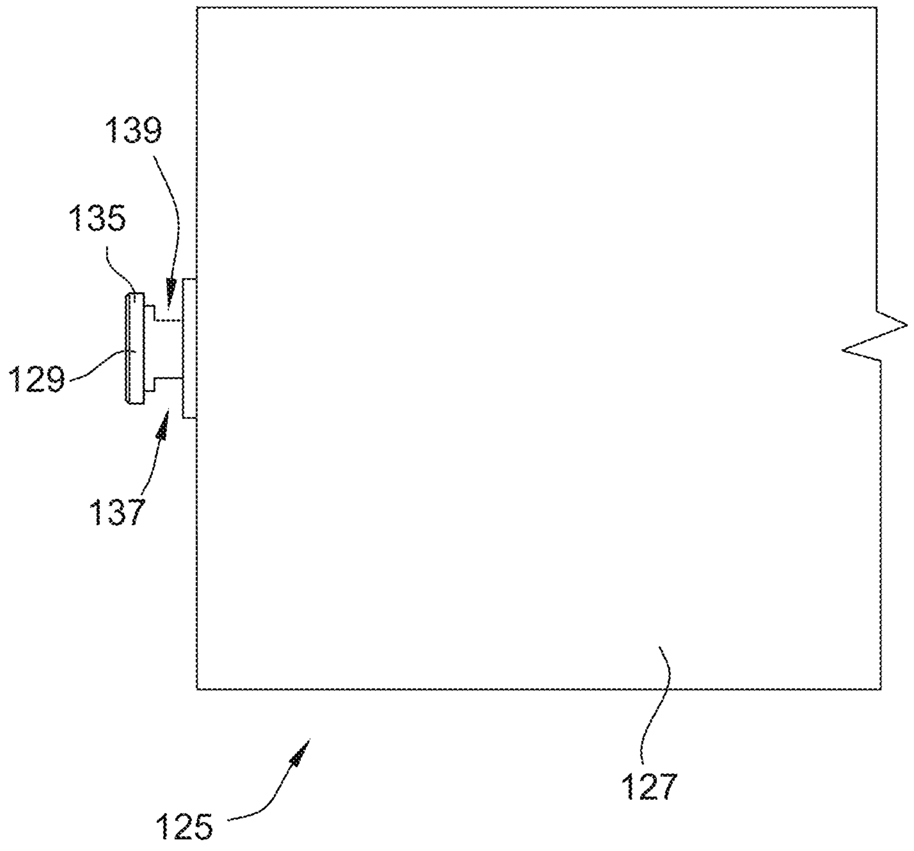
FIG. 5 is a front view of a roller.
Figure 6:
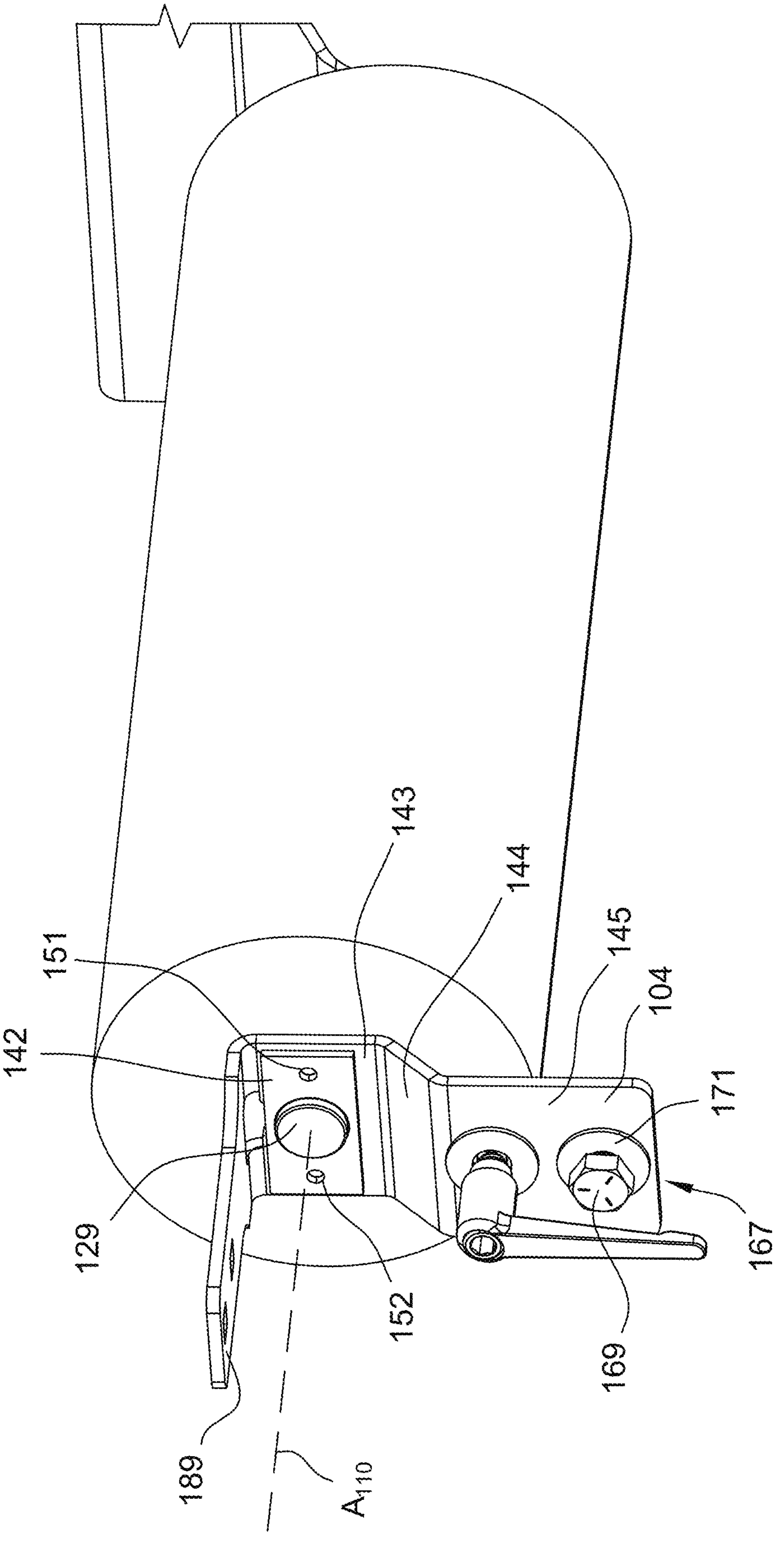
FIG. 6 is a perspective view of the first bracket assembly with the second bracket of the assembly not shown.

The first bracket assembly 100 includes a first bracket 104 and a second bracket 108. The first bracket 104 includes an opening 110 (FIG. 4) for receiving the roller shaft 129 (FIG. 5). The shaft 129 may be held in place (i.e., preventing from lifting) by a clip 142 (FIG. 6). The clip 142 may include apertures 151, 152 for receiving a fastener (e.g., bolt) to secure the clip 142 to the first bracket 104.

The opening 110 (FIG. 4) of the first bracket 104 defines a central axis $A_{110}$ (FIG. 6) that extends through the opening 110. The first bracket 104 includes an upper segment 143, a lower segment 145 and an intermediate segment 144 disposed between the upper segment 143 and the lower segment 145. The intermediate segment 144 extends at least partially in a direction parallel to the central axis $A_{110}$ and toward the second bracket 108 (FIG. 1) such that the upper segment 143 and lower segment 145 are not vertically aligned.

Figure 3:
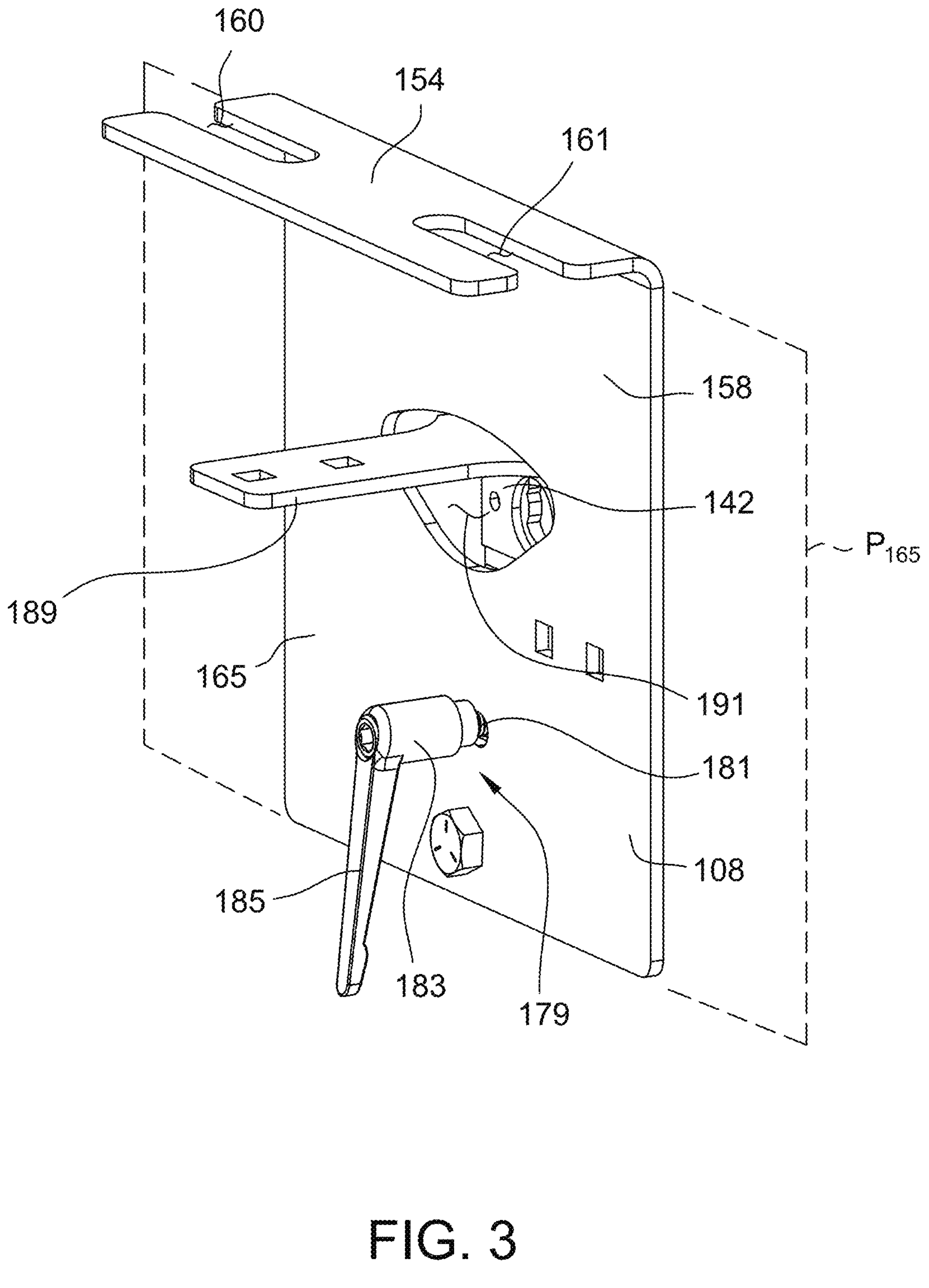
FIG. 3 is a perspective view of the first bracket assembly.

Referring now to FIG. 3, the second bracket 108 includes a first portion 154 for connecting the second bracket 108 to the support frame. In some embodiments, the first portion 154 includes a first opening 160 for receiving a first fastener (not shown) for connecting the first portion 154 to a support frame and a second opening 161 for receiving a second fastener (not shown) for connecting the first portion 154 to the support frame. In the illustrated embodiment, the first and second openings 160, 161 are slots (e.g., slots having an open end). The second bracket 108 includes a second portion 158 that is perpendicular to the first portion 154.

Figure 2:
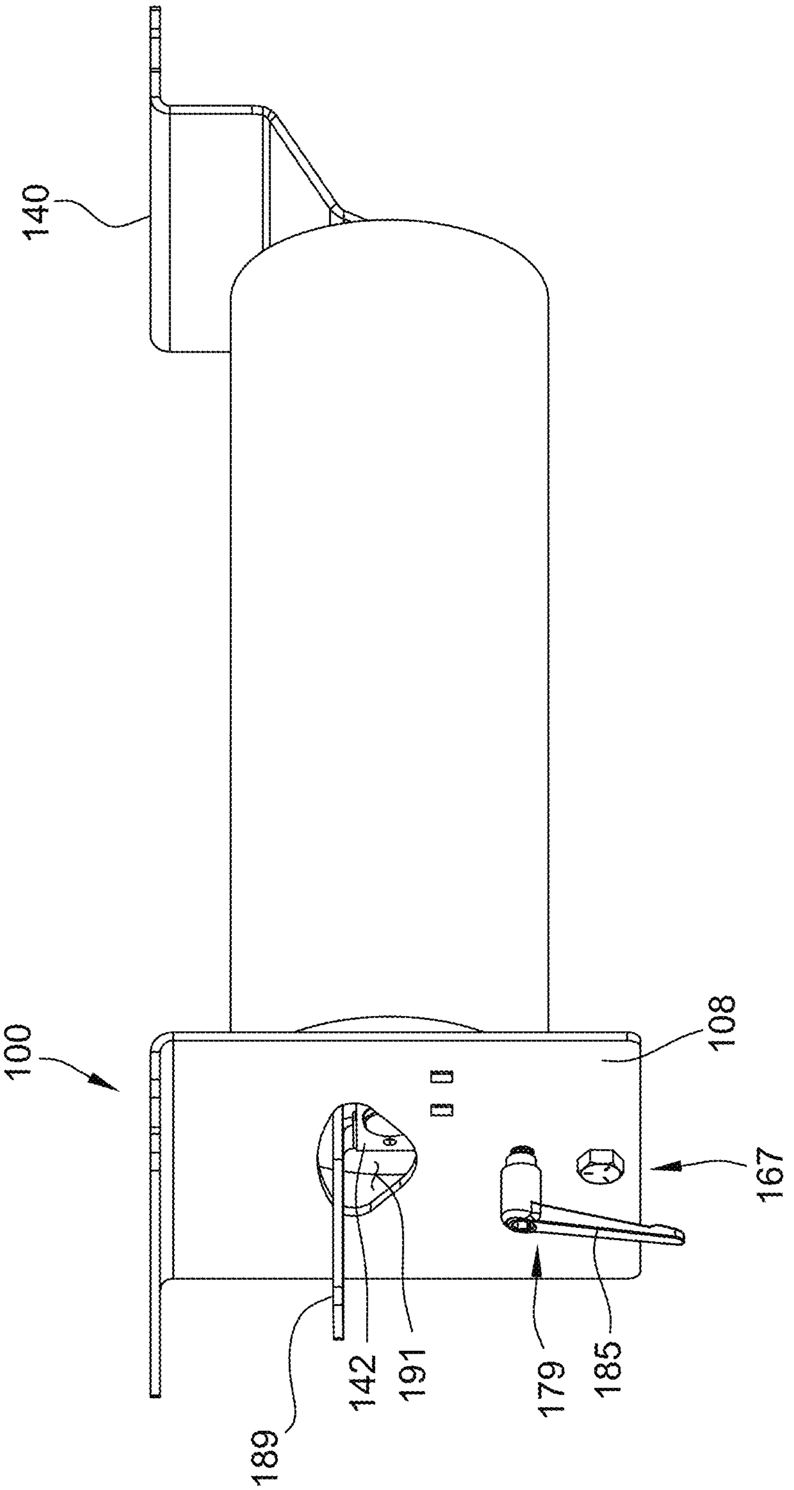
FIG. 2 is a perspective view of the first and second bracket assemblies and roller.

The second bracket 108 is pivotally connected to the first bracket 104 (FIG. 2) by a pivot connector 167. In the illustrated embodiment, the second portion 158 of the second bracket 108 includes the pivotal connection with the first bracket 104. The second portion 158 includes an outer face 165 (FIG. 3) which defines an outer face plane $P_{165}$ that is coincident with at least a portion of the outer face 165.

Figure 7:
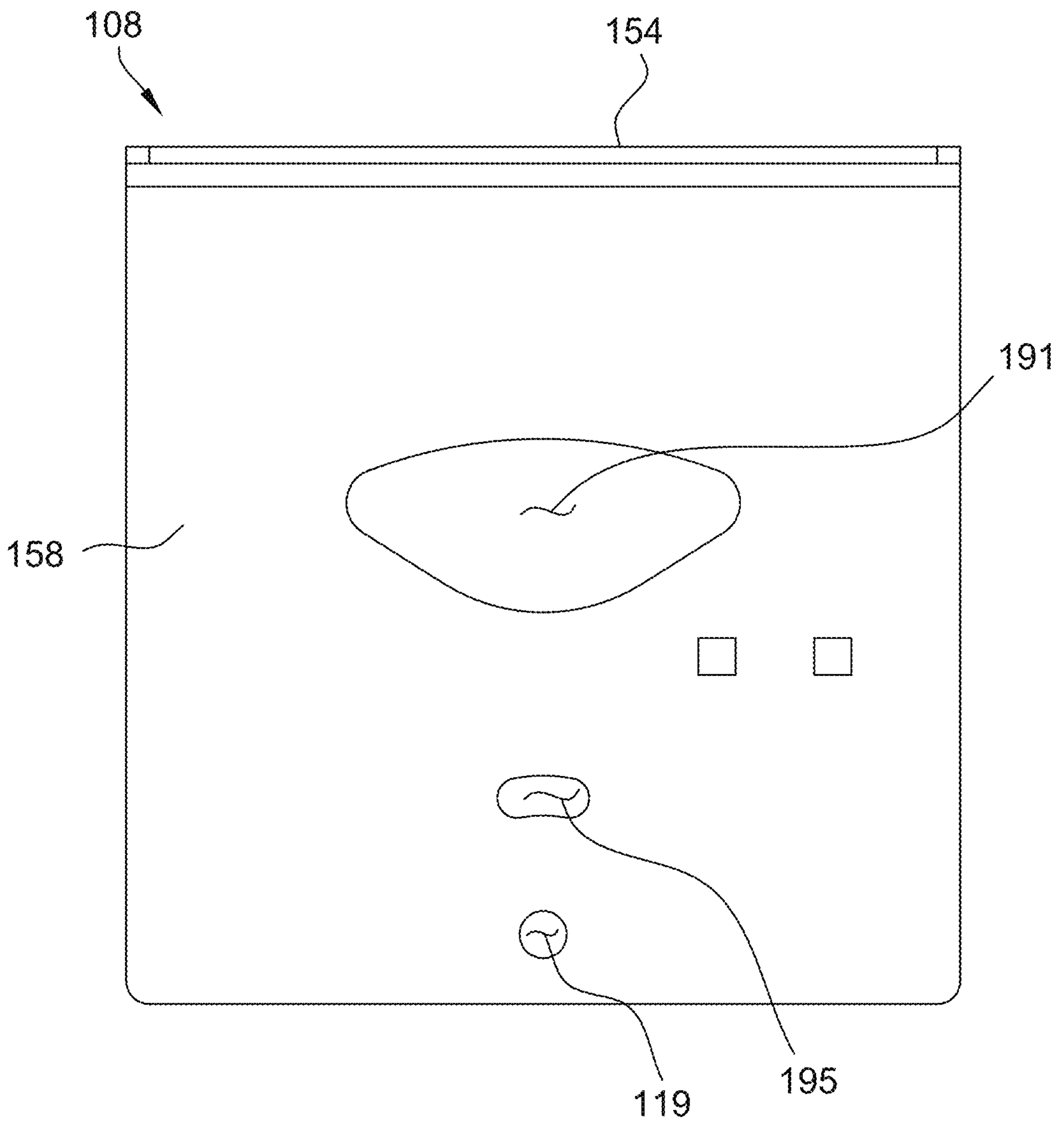
FIG. 7 is a side view of the second bracket of the first bracket assembly.
Figure 8:
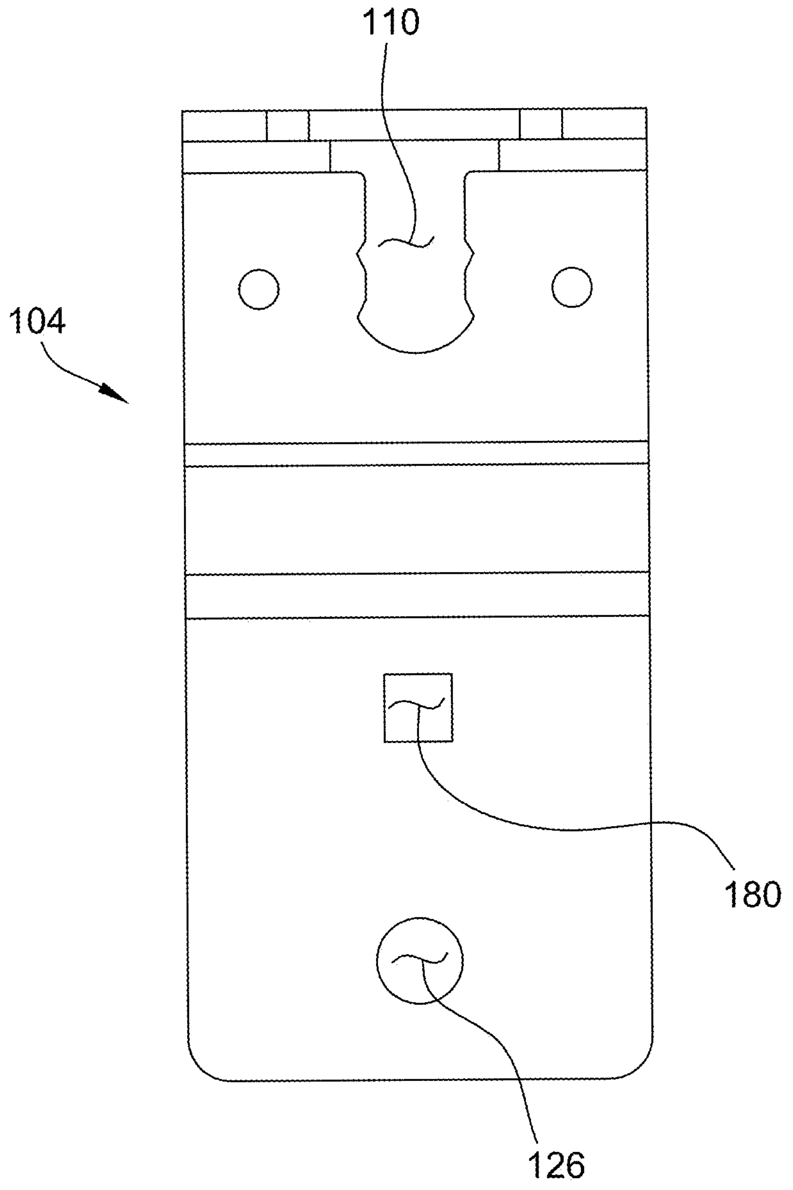
FIG. 8 is a side view of the first bracket of the first bracket assembly.

In the illustrated embodiment, the pivot connector 167 (FIG. 1) includes a bolt 169 about which the first bracket 104 pivots. Alternatively, the bolt 169 and first bracket 104 may move together with the bolt 169 rotating within the second bracket 108. The pivot connector 167 extends through an opening 119 (FIG. 7) of the second bracket 108 and an opening 126 (FIG. 8) of the first bracket 104. The pivot connector 167 includes a nut 170 (e.g., lock nut) that is threadingly connected to the bolt 169. The pivot connector 167 includes a washer 171 (FIG. 6) disposed between the first bracket 104 and the second portion 158 of the second bracket 108. The bolt 169 passes through the washer 171. The nut 170 may be tightened on the bolt 169 sufficiently to reduce flex between the two brackets 104, 108 but sufficiently loose to allow the two brackets 104, 108 to pivot relative to each other (with or without an amount of friction between the brackets 104, 108).

Any pivot connector 167 that enables the first and second brackets 104, 108 to pivot relative to each other may be used unless stated otherwise. For example, the pivot connector 167 may be a pin about which the first and/or second brackets 104, 108 pivots. In some embodiments, the pivot connector 167 does not include a nut disposed between the first and second brackets 104, 108.

The bracket assembly 100 includes a locking fastener 179 (or more simply "fastener") that enables the first and second brackets 104, 108 to be selectively locked together. The fastener 179 is moveable between a locked position in which the first bracket 104 is prevented from pivoting relative to the second bracket 108 and an unlocked position in which the first bracket 104 may pivot relative to the second bracket 108.

In the illustrated embodiment, the fastener 179 includes a threaded bolt 181 (FIG. 4) that extends through the first bracket 104 and the second bracket 108. The first bracket 104 includes an opening 180 (FIG. 8) that receives the bolt 181. The second portion 158 of the second bracket 108 (FIG. 7) includes a slot 195 that receives the bolt 181. In the illustrated embodiment, the slot 195 is curved. The slot 195 limits movement of the first bracket 104 relative to the second bracket 108 when the fastener 179 is in the unlocked positions.

The fastener 179 includes a threaded case 183 (FIG. 3) is disposed about the bolt 181 and threadingly engages the bolt 181. A fastener handle 185 extends from the threaded case 183. The handle 185 enables an operator to move the fastener 179 between the locked and unlocked position.

As shown in FIG. 3, the first bracket assembly 100 includes a bracket assembly handle 189 (or more simply "handle"). The handle 189 extends through the outer face plane $P_{165}$ of the second portion 158 of the second bracket 108 (i.e., outward past the second portion 158 to allow a user to grasp the handle 189). In the illustrated embodiment, the handle 189 extends through an opening 191 defined by the second portion 158 of the second bracket 108. In other embodiments, the handle 189 is positioned to a side of the second bracket 108.

In the illustrated embodiment and as shown in FIG. 6, the first bracket 104 comprises the handle 189 (i.e., they are integral). In other embodiments, the handle 189 is connected to the first bracket 104.

To change the position of the roller 125 to align a conveyor belt, an operator grasps the handle 185 of the locking fastener 179 and turns the handle counter-clockwise to move the fastener 179 to the unlocked position. The operator grasps the handle 189 of the bracket assembly 100 and moves the first bracket 104 and roller 125 left or right, depending on the mis-alignment of the conveyor belt. Once adjusted, the handle 185 of the locking fastener 179 is grasped and the fastener is turned clockwise to lock the bracket assembly 100 such that the first and second brackets 104, 108 cannot pivot relative to each other. The pivot connector 167 may be sufficiently torqued to keep the connector 167 in place but allow the first and second brackets 104, 108 to pivot relative to each other when the locking fastener is in the unlocked position.

Another embodiment of the bracket assembly 200 is shown in FIGS. 9-13. The components shown in FIGS. 9-13 that are analogous to those of FIGS. 1-8 are designated by the corresponding reference number of FIGS. 1-8 plus "100" (e.g., part 123 becomes 223). The bracket assembly 200 includes a first bracket 204 that includes an opening 210 (FIG. 10) for receiving a roller shaft 129 (FIG. 5). A clip 242 (FIG. 9) connected to the first bracket 204 helps secure the shaft 129. The bracket assembly 200 also includes a second bracket 208 for connecting the bracket assembly 200 to a support frame (not shown). The second bracket 208 is pivotally connected to the first bracket 204 by a pivot connector 267. The pivot connector 267 is above the central axis $A_{210}$ (FIG. 13) that extends through the opening 210 (FIG. 10) of the first bracket 204. In the illustrated embodiment, the bracket assembly 200 does not include a lock (e.g., locking fastener).

Figure 12:
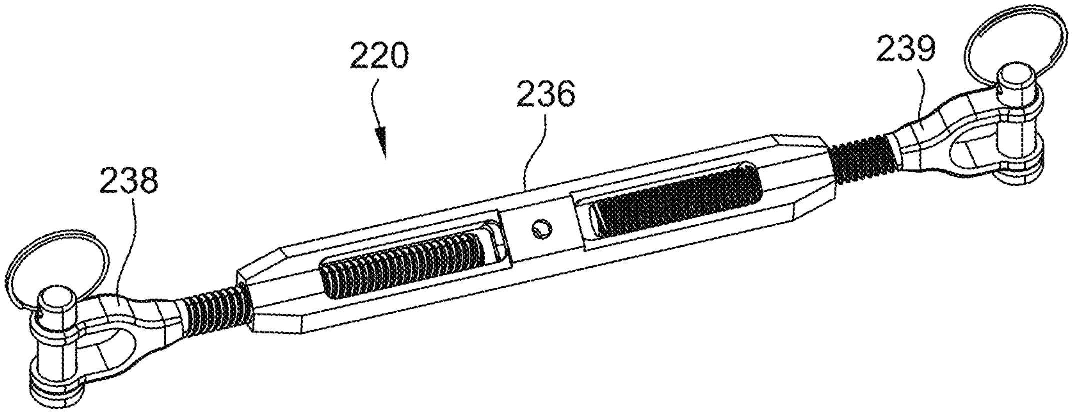
FIG. 12 is a side view of a turnbuckle of the first bracket assembly.
Figure 13:
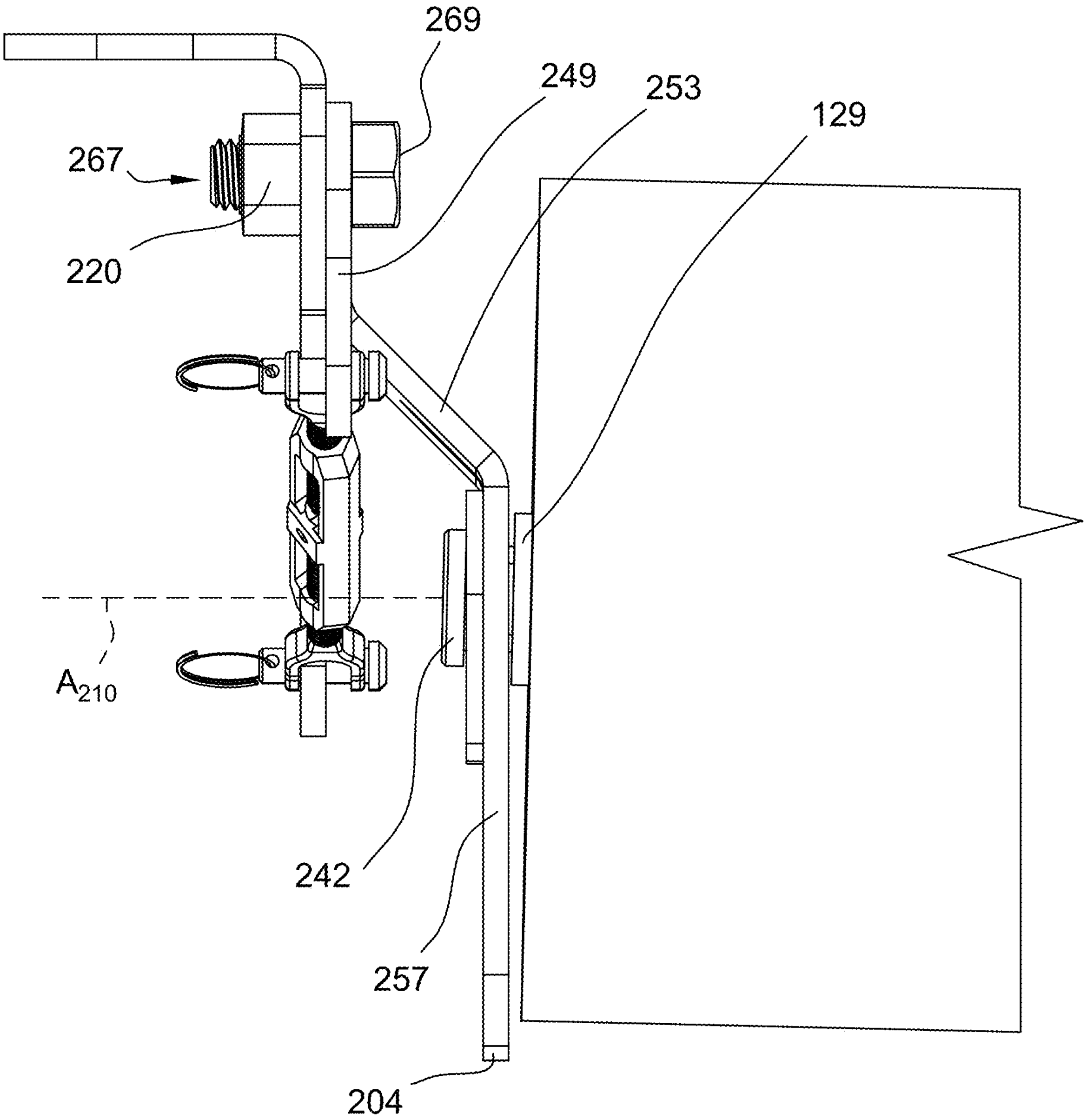
FIG. 13 is a front view of the first bracket assembly and a roller.
Figure 14:
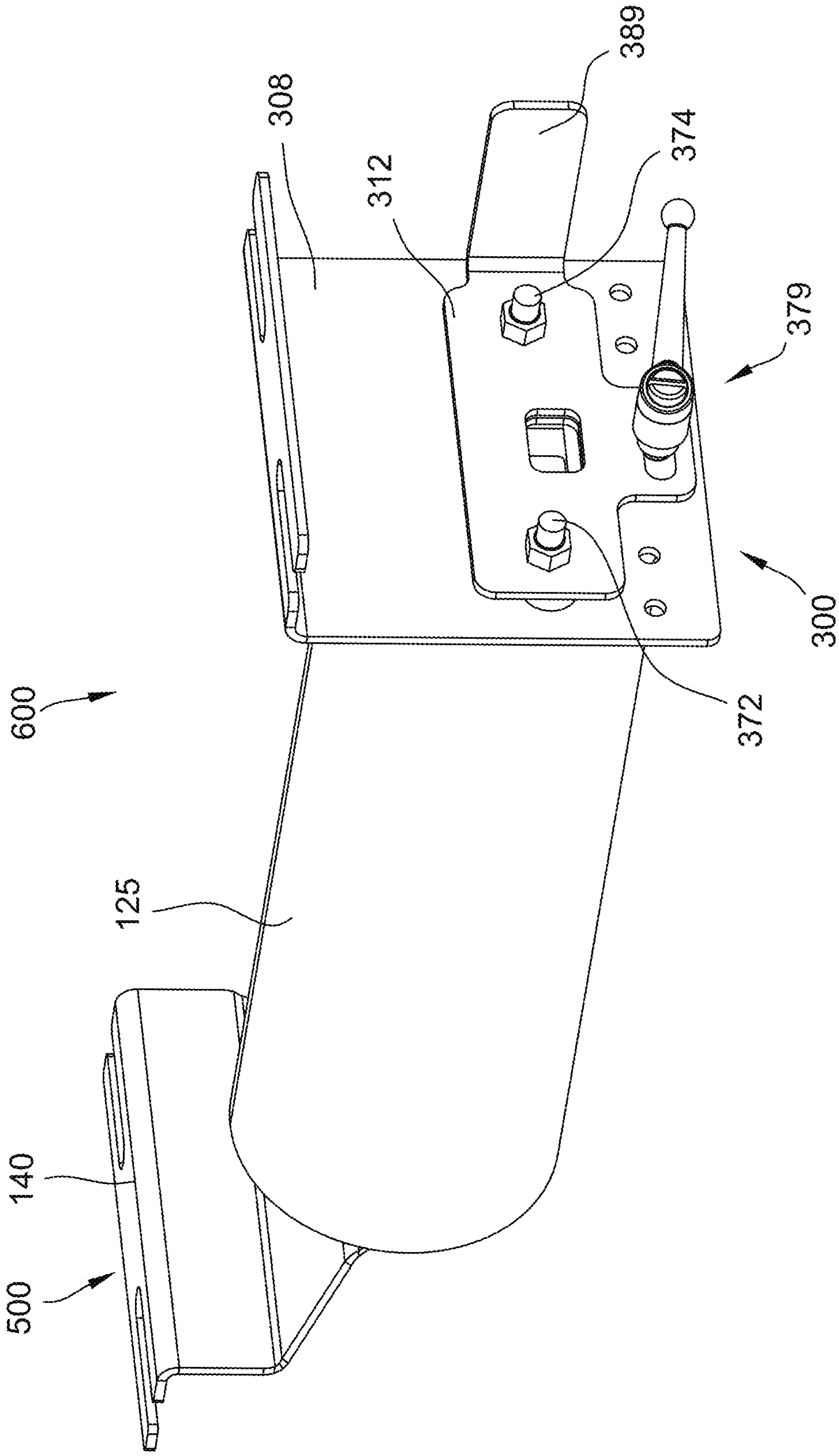
FIG. 14 is a perspective view of a first bracket assembly of another embodiment of the present disclosure and a second bracket assembly securing a conveyor belt roller.

The bracket assembly 200 includes a turnbuckle 220 connected to the first bracket 204 at a first end and connected to the second bracket 208 at its opposite end. Referring now to FIG. 12, the turnbuckle 220 includes a threaded barrel 236 and at least one pin (e.g., first and second pins 238, 239 as shown) that threadingly engages the barrel 236. When an operator rotates the barrel 236, the first bracket 204 pivots relative to the second bracket 208. The direction in which the brackets 204, 208 pivot relative to each other depends on the direction of rotation of the barrel 236.

Figure 9:
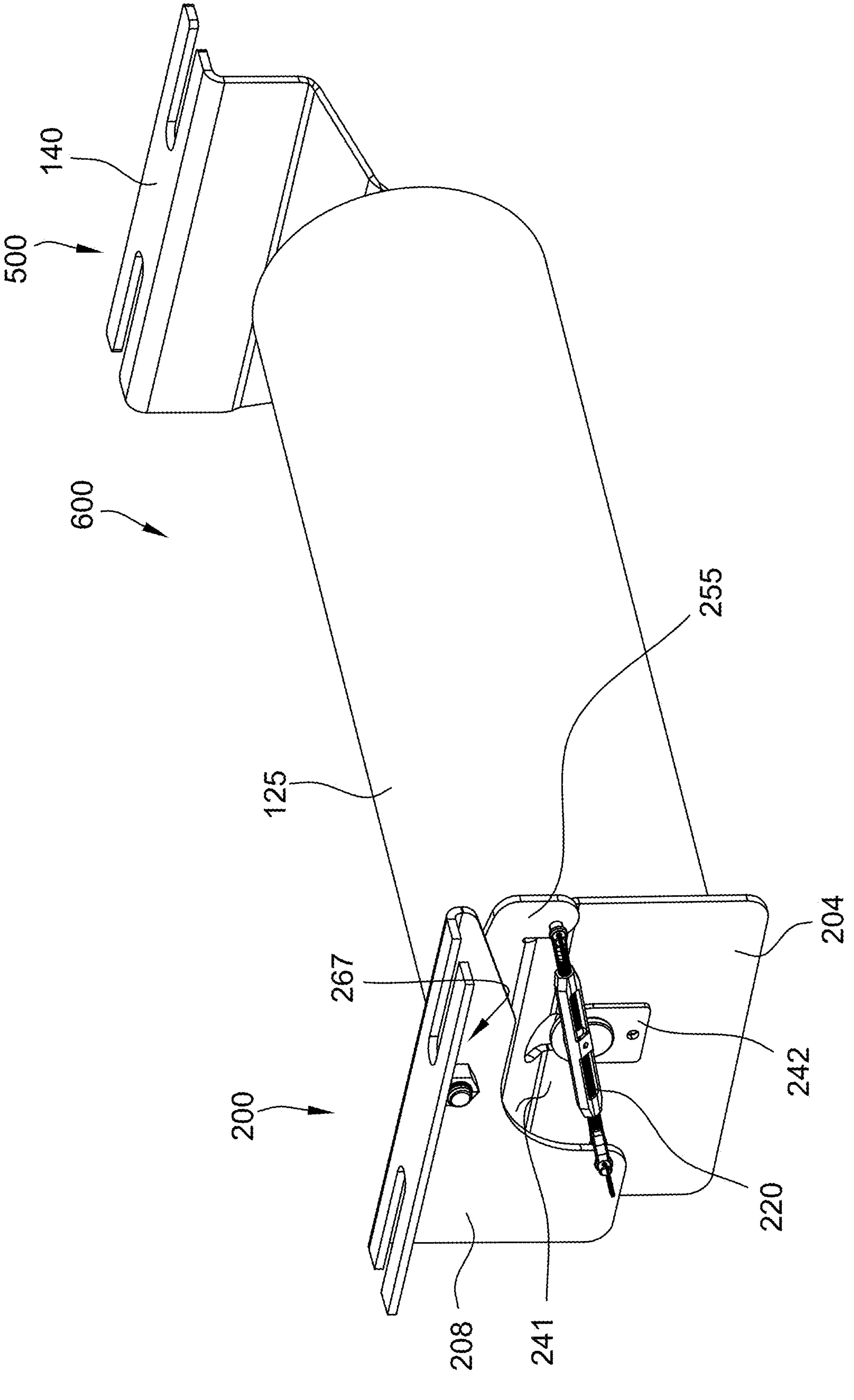
FIG. 9 is a perspective view of a first bracket assembly of another embodiment of the present disclosure and a second bracket assembly securing a conveyor belt roller.
Figure 10:
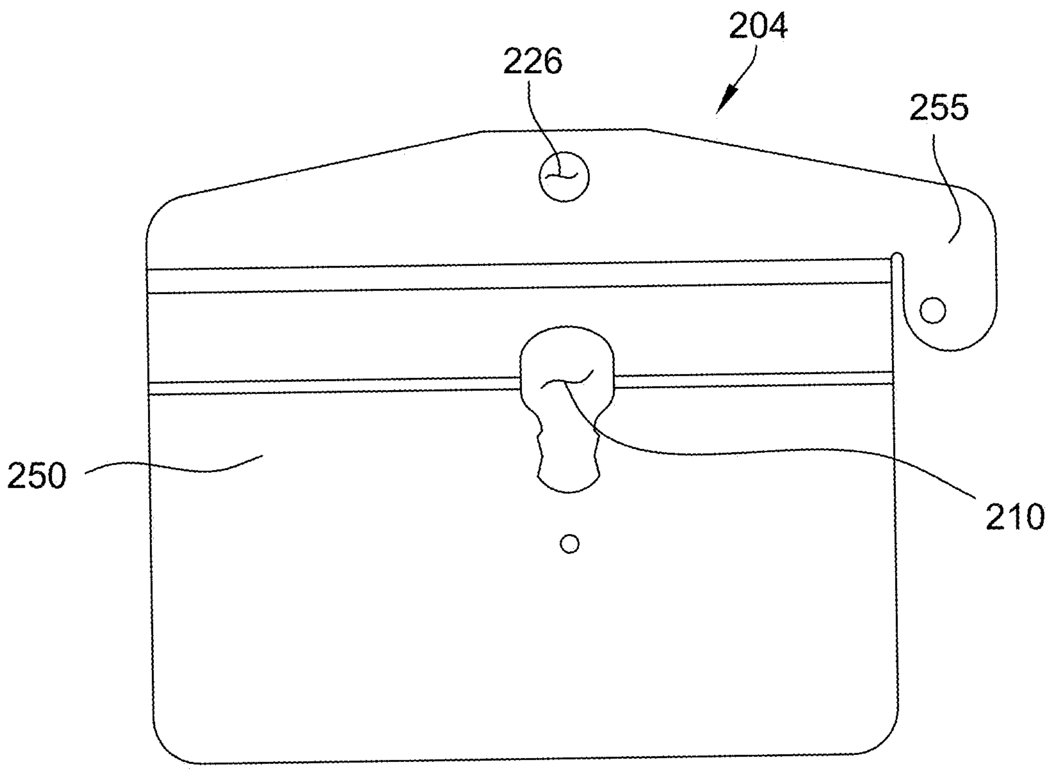
FIG. 10 is a side view of a second bracket of the first bracket assembly of FIG. 9.
Figure 11:
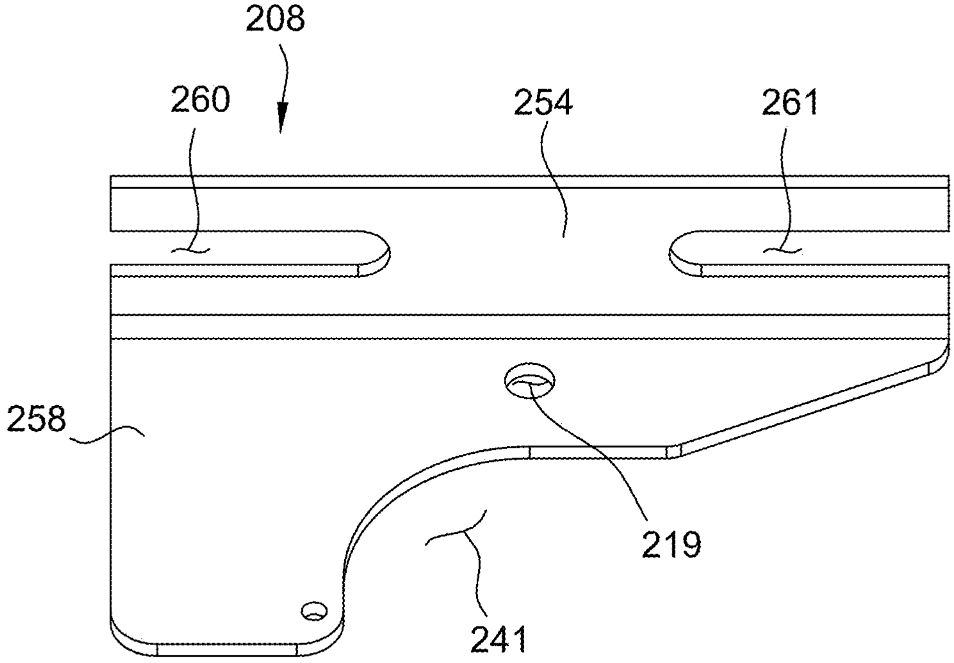
FIG. 11 is a perspective view of a first bracket of the first bracket assembly.

The turnbuckle 220 is pivotally connected to the first bracket 204 and the second bracket 208. The first bracket 204 includes a main body 250 (FIG. 10) and a leg 255 that extends from the main body 250. The turnbuckle 220 (FIG. 9) is connected to the leg 255. As shown in FIGS. 9 and 11, the second bracket 208 includes a cut-out 241 with the turnbuckle 220 extending across the cut-out 241 toward the leg 255 of the first bracket 204.

In the illustrated embodiment, the pivot connector 267 (FIG. 13) includes a bolt 269 about which the first bracket 204 and/or second bracket 208 pivots. The bolt 269 is threadingly engaged with a nut 270 (e.g., lock nut). The pivot connector 267 extends through an opening 219 (FIG. 11) of the second bracket 208 and an opening 226 (FIG. 10) of the first bracket 204. In some embodiments, the bolt 269 may extend through a washer (not shown) disposed between the first bracket 204 and the second bracket 208.

The first bracket 204 includes an upper segment 249, a lower segment 257 and an intermediate segment 253 disposed between the upper segment 249 and the lower segment 257. The intermediate segment 253 extends at least partially in a direction parallel to the central axis $A_{210}$ and toward the second bracket 208 (FIG. 1) such that the upper segment 143 and lower segment 145 are not vertically aligned.

The second bracket 208 (FIG. 11) includes a first portion 254 for connecting the second bracket 208 to a support frame (not shown). A second portion 258 is perpendicular to the first portion 254. The second portion 258 is pivotally connected to the first bracket 204. The first portion 254 includes a first opening 260 for receiving a first fastener (not shown) for connecting the first portion 254 to a support frame and a second opening 261 for receiving a second fastener (not shown) for connecting the first portion 254 to a support frame.

Figure 15:
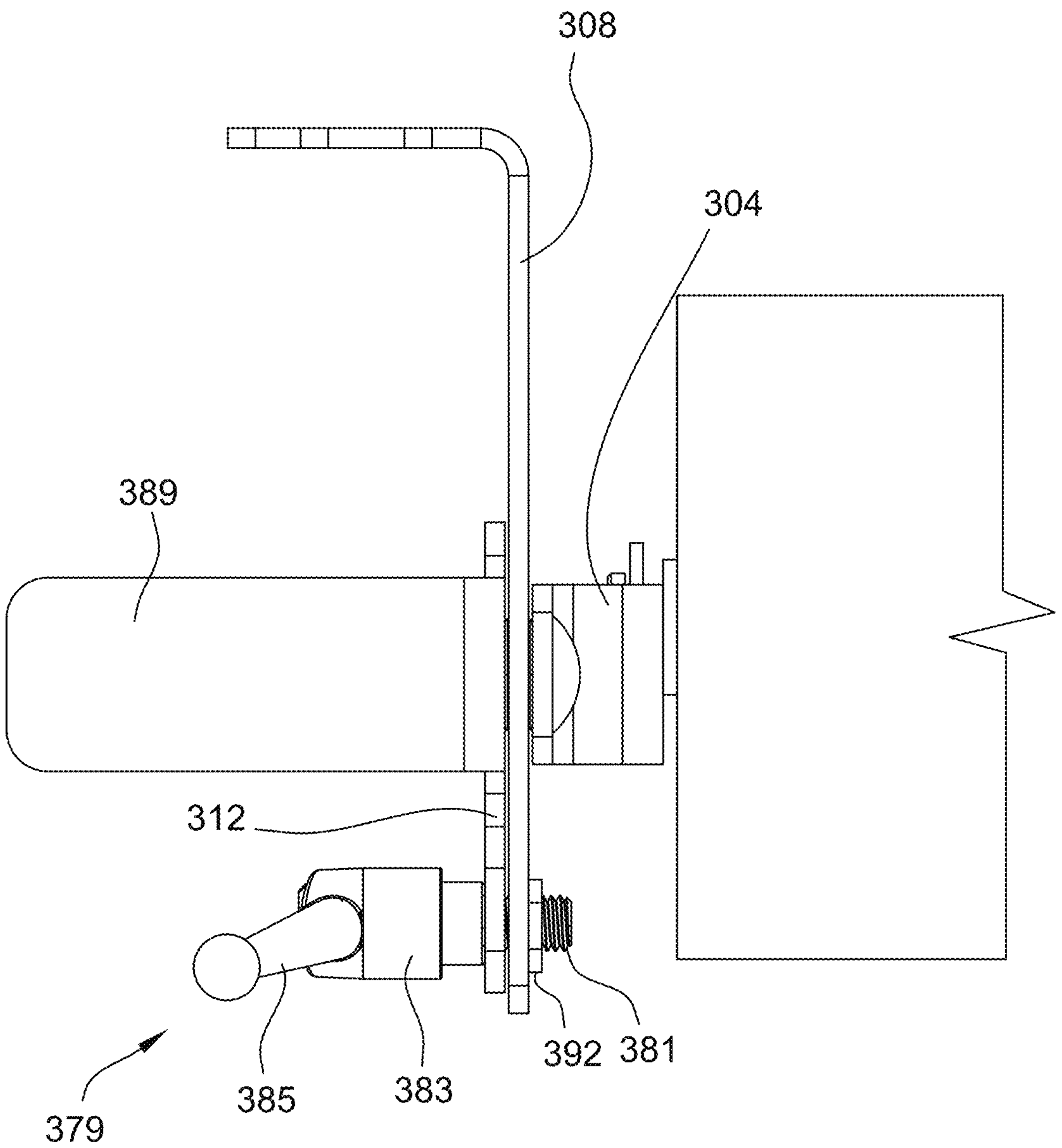
FIG. 15 is a front view of the first bracket assembly of FIG. 14 and a roller.
Figure 16:
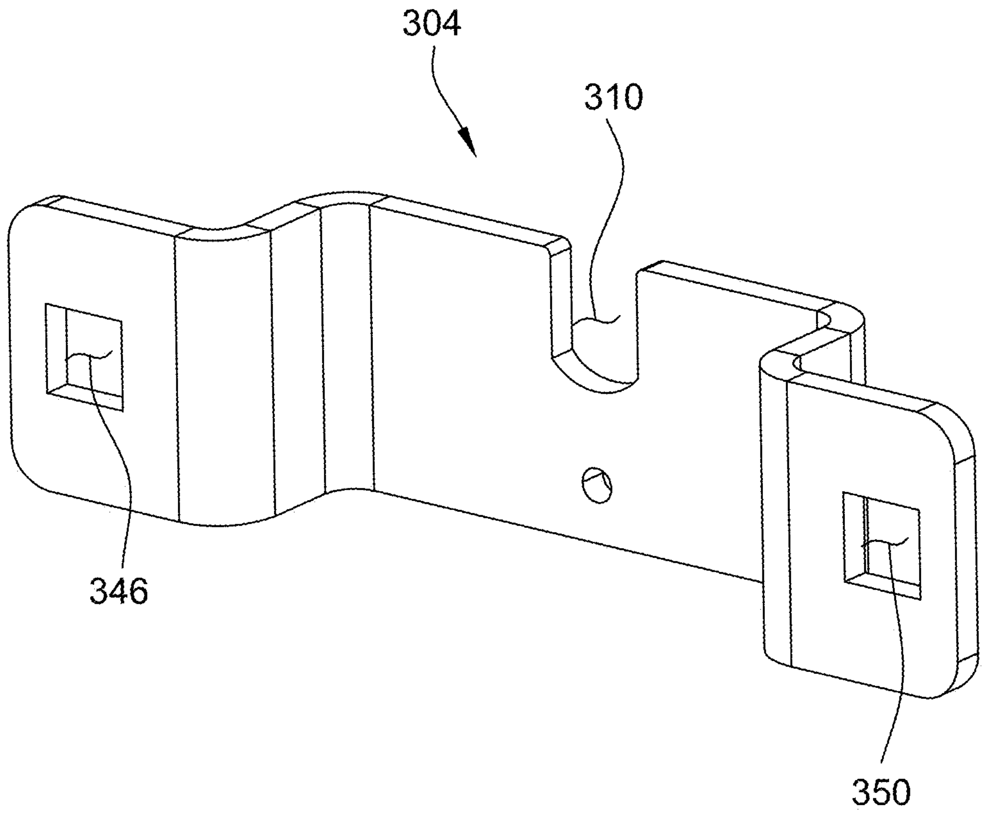
FIG. 16 is a perspective view of a first bracket of the first bracket assembly.
Figure 19:
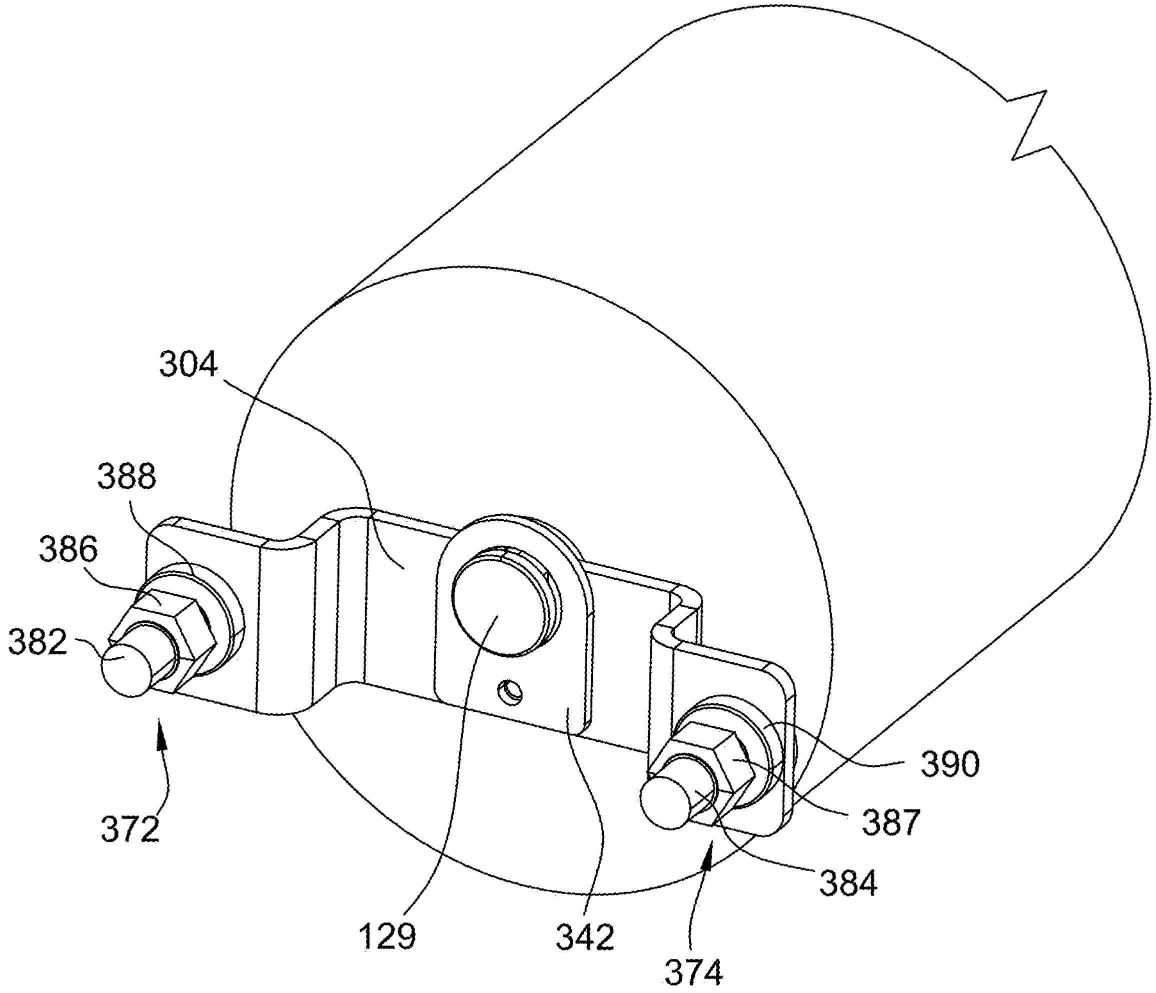
FIG. 19 is a perspective view of a third bracket and clip of the first bracket assembly and a roller.

Another embodiment of the bracket assembly 200 is shown in FIGS. 14-19. The components shown in FIGS. 14-19 that are analogous to those of FIGS. 1-8 are designated by the corresponding reference number of FIGS. 1-8 plus "200" (e.g., part 123 becomes 323). The bracket assembly 300 includes a first bracket 304 (FIG. 19) that includes an opening 310 (FIG. 16) for receiving a roller shaft 129 (FIG. 19). A clip 342 connected to the first bracket 304 helps secure the shaft 129. The bracket assembly 300 includes a second bracket 308 (FIG. 14) for connecting the bracket assembly 300 to a support frame (not shown). The bracket assembly 300 includes a third bracket 312 that is connected to the first bracket 304. As shown in FIG. 15, the second bracket 308 is disposed between the first bracket 304 and the third bracket 312. The first and third brackets 304, 312 slidingly engage the second bracket 308 as further discussed below.

Figure 17:
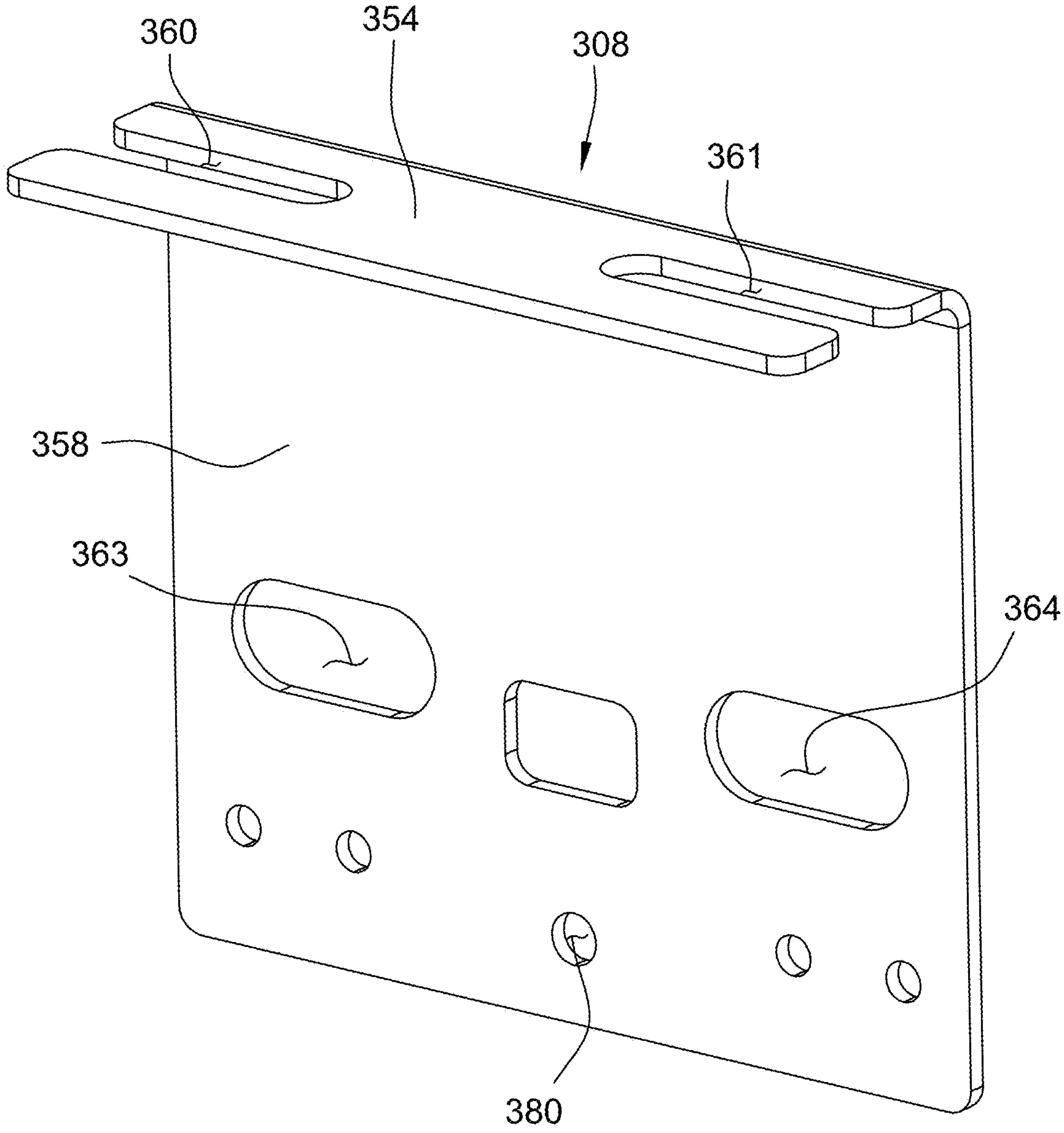
FIG. 17 is a perspective view of a second bracket of the first bracket assembly.
Figure 18:
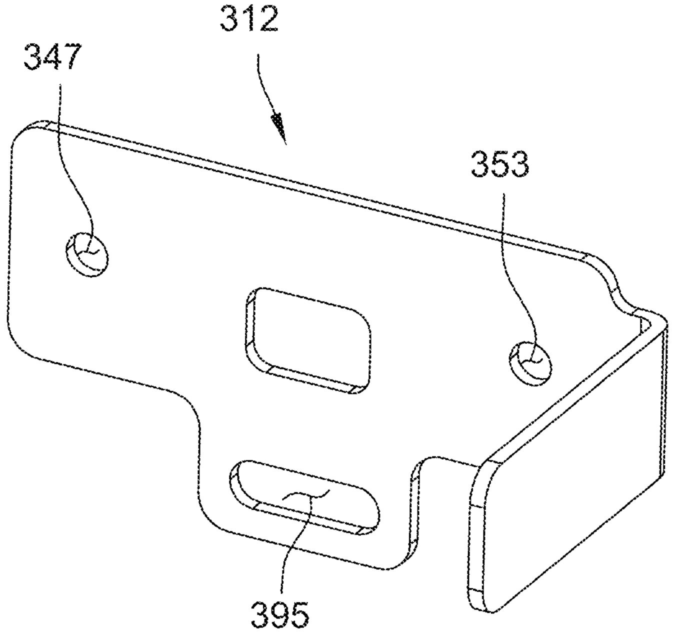
FIG. 18 is a perspective view of a third bracket of the first bracket assembly.

Referring now to FIG. 17, the second bracket 308 includes a first portion 354 for connecting the second bracket 308 to a support frame (not shown). A second portion 358 is perpendicular to the first portion 354. The first portion 354 includes first and second openings 360, 361 for receiving fasteners (not shown) that connect the first portion 354 to a support frame. The second bracket 308 defines at least one slot (first and second slots 363, 364 being shown in the illustrated embodiment). First and second coupling fasteners 372, 374 (FIG. 14) extend through the slots 363, 364, respectively, to connect the third bracket 312 to the first bracket 304.

In the illustrated embodiment, the first and second coupling fasteners 372, 374 (FIG. 19) are bolts 382, 384 and nuts 386, 387. The first and second coupling fasteners 372, 374 also include washers 388, 390 with the washers 388, 390 being disposed within a slot 363, 364 (FIG. 17) of the second bracket 308 and between the first and third brackets 304, 312. The first coupling fastener 372 extends through a first coupling opening 346 (FIG. 16) of the first bracket 304 and a first coupling opening 347 (FIG. 18) of the third bracket 312. The second coupling fastener 374 extends through a second coupling opening 350 (FIG. 16) of the first bracket 304 and a second coupling opening 353 (FIG. 18) of the third bracket 312.

The bracket assembly 300 includes a locking fastener 379 (or more simply "fastener") that enables the first and third brackets 304, 312 to be selectively locked (i.e., prevented from sliding) relative to the second bracket 308. The locking fastener 379 is moveable between a locked position in which the first and third brackets 304, 312 are prevented from sliding relative to the second bracket 308 and an unlocked position in which the first bracket 304 and third bracket 312 may slide relative to the second bracket 308.

In the illustrated embodiment, the locking fastener 379 includes a threaded bolt 381 (FIG. 15) that extends through the second bracket 308 and the third bracket 312. The second bracket 308 includes an opening 380 (FIG. 17) that receives the bolt 381. The third bracket 312 (FIG. 18) includes a slot 395 that receives the bolt 381. The bolt 381 may be threaded to a nut 392.

A threaded case 383 (FIG. 15) is disposed about the bolt 381 and threadingly engages the bolt 381. A fastener handle 385 extends from the threaded case 383. The handle 385 enables an operator to move the fastener 379 between the locked and unlocked positions.

The bracket assembly 300 also includes a bracket assembly handle 389 (or more simply "handle"). The handle 389 enables an operator to slide the first bracket 304 and third bracket 312 relative to the second bracket 308 when the locking fastener 379 is in the unlocked position. In the illustrated embodiment, the third bracket 312 comprises the handle 389 (i.e., they are integral). In other embodiments, the handle 389 is connected to the third bracket 312.

Figure 20:
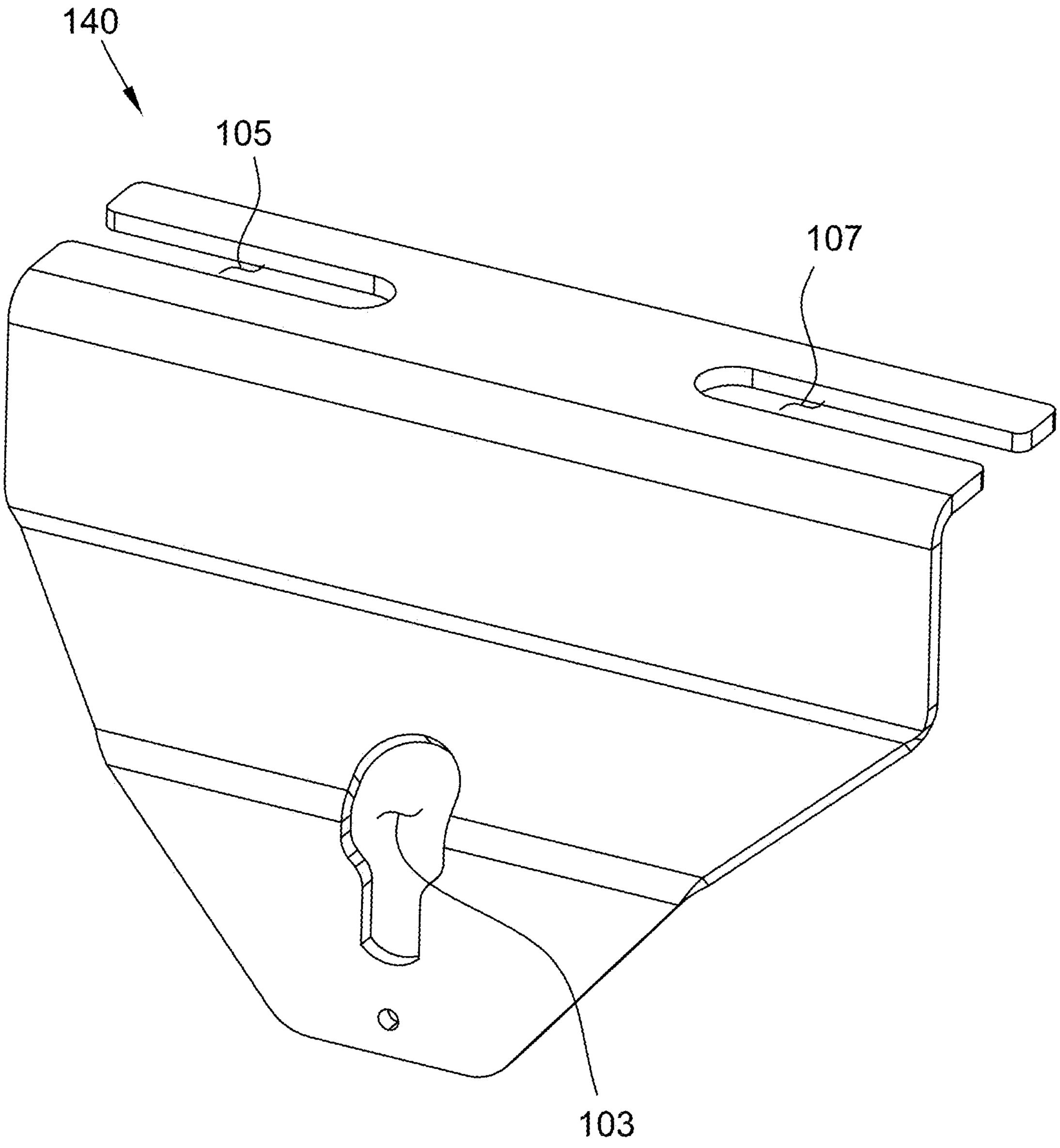
FIG. 20 is a perspective view of a second bracket assembly.

The bracket assemblies (100, 200, 300) described above may each be part of a bracket system 500 for securing a conveyor belt roller to a support frame. The bracket system 500 also includes the second bracket assembly 140 (FIG. 20). The second bracket assembly 140 includes an opening 103 for receiving a shaft 129 (or second shaft if the roller includes stub shafts) of the roller 125. The second bracket assembly 140 may include a clip (not shown) which secures the shaft 129. The second bracket assembly 140 also includes openings 105, 107 for receiving fasteners for connecting the bracket assembly to a support frame (now shown).

Each bracket system 500 described above may be part of a conveyor system 600. The conveyor system 600 includes a plurality of rollers 125 with the shaft(s) of each rollers each being securing by a bracket system 500 described above.

Compared to conventional bracket assemblies, the bracket assemblies of the present disclosure have several advantages. By use of a fastener that includes a handle for selectively locking the first and second brackets, adjustment of the roller position and alignment of the conveyor belt may be performed by an operator without tools. The bracket assembly handle allows the operator to grasp the bracket and move the roller to align the conveyor belt. In embodiments in which the bracket assembly includes a washer disposed between the first and second brackets, corrosion between the first and second brackets that causes the brackets to join together may be prevented. In embodiments in which the bracket assembly does not include a nut in the pivotal connection between the first and second brackets, the bracket assembly may include less flex and better secures the roller.

The bracket assemblies may allow for relatively precise control of belt alignment (e.g., precise control of the pivot or slide between brackets). The bracket assemblies allow for correction of the belt alignment at relatively low cost (i.e., low manufacturing cost). The bracket assemblies have relatively small surfaces on which conveyed material may accumulate. The bracket assemblies eliminate the need to "knock" or manually pivot return idlers secured by conventional bracket assemblies. The bracket assemblies enable the idler position to be adjusted while the conveyor is operating.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A bracket assembly for changing the position of a roller to align a conveyor belt, the bracket assembly comprising:
- a first bracket having an opening for receiving a roller shaft;
- a second bracket pivotally connected to the first bracket, the second bracket comprising:
  - a first portion for connecting the second bracket to a support frame; and
  - a second portion perpendicular to the first portion, the second portion being pivotally connected to the first bracket, the second portion including an outer face which defines an outer face plane that is coincident with at least a portion of the outer face;
- a fastener moveable between a locked position in which the first bracket is prevented from pivoting relative to the second bracket and an unlocked position in which the first bracket may pivot relative to the second bracket, the fastener comprising:
  - a threaded bolt that extends through the first bracket and the second bracket;
  - a threaded case disposed about the bolt; and
  - a fastener handle that extends from the threaded case that enables an operator to move the fastener between the locked and unlocked positions; and
- a bracket assembly handle that enables an operator to pivot the first bracket relative to the second bracket, the bracket assembly handle extending through the outer face plane defined by the second portion of the second bracket.

2. The bracket assembly as set forth in claim 1 wherein the second portion of the second bracket includes an opening through which the bracket assembly handle extends.

3. The bracket assembly as set forth in claim 1 comprising a pivot connector, the pivot connector comprising a bolt about which the first and/or second bracket pivots.

4. The bracket assembly as set forth in claim 1 comprising a pivot connector, the pivot connector comprising a pin about which the first and/or second bracket pivots.

5. The bracket assembly as set forth in claim 1 comprising a pivot connector, the pivot connector not comprising a nut disposed between the first and second brackets.

6. The bracket assembly as set forth in claim 1 wherein the second portion of the second bracket comprises a curved slot, the fastener extending through the curved slot.

7. The bracket assembly as set forth in claim 1 wherein the first bracket comprises the bracket assembly handle.

8. The bracket assembly as set forth in claim 1 wherein the first bracket is connected to the bracket assembly handle.

9. A bracket assembly for changing the position of a roller to align a conveyor belt, the bracket assembly comprising:

a first bracket having an opening for receiving a roller shaft, the opening of the first bracket defining a central axis that extends through the opening, the first bracket comprising:

an upper segment, a lower segment; and an intermediate segment disposed between the upper segment and the lower segment; and a second bracket pivotally connected to the first bracket, the intermediate segment of the first bracket extending at least partially in a direction parallel to the central axis and toward the second bracket such that the upper segment and lower segment of the first bracket are not vertically aligned, the second bracket comprising:

a first portion for connecting the second bracket to a support frame; and a second portion perpendicular to the first portion, the second portion being pivotally connected to the first bracket, the second portion including an outer face which defines an outer face plane that is coincident with at least a portion of the outer face;

a fastener moveable between a locked position in which the first bracket is prevented from pivoting relative to the second bracket and an unlocked position in which the first bracket may pivot relative to the second bracket; and a handle that enables an operator to pivot the first bracket relative to the second bracket, the handle extending through the outer face plane defined by the second portion of the second bracket.

10. The bracket assembly as set forth in claim 1 wherein the first portion of the second bracket comprises:

a first opening for receiving a first fastener for connecting the first portion to a support frame; and a second opening for receiving a second fastener for connecting the first portion to a support frame.

11. A bracket assembly for changing the position of a roller to align a conveyor belt, the bracket assembly comprising:

a first bracket having an opening for receiving a roller shaft;

a second bracket for connecting the bracket assembly to a frame, the second bracket being pivotally connected to the first bracket; and a turnbuckle connected to the first bracket and the second bracket, the turnbuckle comprising a threaded barrel and at least one pin which threadingly engages the barrel, wherein rotation of the barrel causes the first bracket to pivot relative to the second bracket.

12. The bracket assembly as set forth in claim 11 wherein:

the second bracket forms a cut-out, the turnbuckle extending across the cut-out toward the first bracket; and the first bracket comprises a main body and a leg extending from the main body, the turnbuckle being connected to the leg.

13. The bracket assembly as set forth in claim 11 comprising a pivot connector, the pivot connector comprising a bolt about which the first and/or second bracket pivots.

14. The bracket assembly as set forth in claim 11 comprising a pivot connector, the pivot connector not comprising a nut disposed between the first and second brackets.

15. The bracket assembly as set forth in claim 11 wherein:

the second bracket comprises:

a first portion for connecting the second bracket to a support frame; and a second portion perpendicular to the first portion, the second portion being pivotally connected to the first bracket; and the first portion comprises:

a first opening for receiving a first fastener for connecting the first portion to a support frame; and a second opening for receiving a second fastener for connecting the first portion to a support frame.

16. A bracket assembly for changing the position of a roller to align a conveyor belt, the bracket assembly comprising:

a first bracket having an opening for receiving a roller shaft;

a second bracket for connecting the bracket assembly to a frame;

a third bracket, the second bracket being disposed between the first bracket and the third bracket, the third bracket being connected to the first bracket;

a handle that enables an operator to slide the first bracket and third bracket relative to the second bracket; and a locking fastener moveable between a locked position in which the first and third brackets are prevented from sliding relative to the second bracket and an unlocked position in which the first bracket and third bracket may slide relative to the second bracket.

17. The bracket assembly as set forth in claim 16 wherein the second bracket defines a first slot and a second slot, the bracket assembly comprising:

a first coupling fastener that extends through the first slot and connects the first bracket to the third bracket; and a second coupling fastener that extends through the second slot and connects the first bracket to the third bracket.

18. The bracket assembly as set forth in claim 16 wherein the handle is connected to the third bracket or the third bracket comprises the handle.

19. The bracket assembly as set forth in claim 16 wherein:

the locking fastener comprises:

a threaded bolt that extends through the first bracket and the second bracket;

a threaded case disposed about the bolt;

a fastener handle that extends from the threaded case that enables an operator to move the fastener between the locked and unlocked positions; and the second bracket comprises:

a first portion for connecting the second bracket to a support frame, the first portion comprising:

a first opening for receiving a first fastener for connecting the first portion to a support frame; and a second opening for receiving a second fastener for connecting the first portion to a support frame; and a second portion perpendicular to the first portion, the second portion slidingly engaging the first bracket and the third bracket.

20. The bracket assembly as set forth in claim 9 wherein the second portion of the second bracket includes an opening through which the handle extends.

* * * * *